United States Patent [19]

McDonnell et al.

[11] Patent Number: 4,912,853
[45] Date of Patent: Apr. 3, 1990

[54] RETICLE PLATE AND METHOD FOR ESTABLISHMENT OF A NORTH-ORIENTED OR SOUTH-ORIENTED LINE BY CIRCUMPOLAR ORIENTATION

[75] Inventors: Michael M. McDonnell, Woodbridge; Donald P. Dere, Lorton, both of Va.

[73] Assignee: The United States of America as represented by the Secretary of the Army, Washington, D.C.

[21] Appl. No.: 322,308

[22] Filed: Nov. 17, 1981

[51] Int. Cl.$^4$ ............................................... G01B 3/12
[52] U.S. Cl. ....................................... 33/228; 33/1 B; 33/262; 33/268; 33/277
[58] Field of Search ................. 33/297, 268, 277, 276, 33/1 B, 1 N, 228; 356/247; 346/17, 18, 289, 284

[56] References Cited

U.S. PATENT DOCUMENTS

| | | | |
|---|---|---|---|
| 2,432,958 | 12/1947 | Wenzel | 33/269 |
| 2,450,712 | 10/1948 | Brown . | |
| 2,460,346 | 2/1949 | Hagner | 33/269 |
| 2,806,287 | 9/1957 | Sullivan . | |
| 3,003,258 | 10/1961 | Stefano | 434/289 |
| 3,190,003 | 3/1962 | O'Brien . | |
| 3,383,987 | 5/1968 | MacMillan . | |
| 3,392,450 | 7/1968 | Herter et al. . | |
| 3,752,591 | 8/1973 | Feldman . | |
| 3,858,326 | 1/1975 | Hurd . | |
| 4,057,902 | 11/1977 | Matsui | 33/1 N |
| 4,205,916 | 6/1980 | Vogl et al. . | |

FOREIGN PATENT DOCUMENTS 342886 2/1931 United Kingdom ................ 434/289

Primary Examiner—William D. Martin, Jr.
Attorney, Agent, or Firm—Darrell E. Hollis

[57] ABSTRACT

A reticle plate provided with a reticle and three concentric circles of varying diameter and methods of use thereof, the invention allows a user to establish a north-oriented or south-oriented line by alignment of selected circumpolar stars with the circles. The circles are located on the reticle plate in positions determined by angles which exist between the celestial north (or south) pole and the particular low-magnitude circumpolar stars chosen as sighting points, the radii of the circles being directly proportional to the objective lens focal length of the theodolite or optical instrument within which the plate is used. A first method of the invention allows unambiguous location of the north or south pole by alignment of each of three selected stars with one each of the three circles. A second method provides data to a user sufficient to locate the pole by alignment of innermost and outermost circles respectively with one each of two of the selected stars.

10 Claims, 1 Drawing Sheet

RETICLE PLATE AND METHOD FOR ESTABLISHMENT OF A NORTH-ORIENTED OR SOUTH-ORIENTED LINE BY CIRCUMPOLAR ORIENTATION

BACKGROUND OF THE INVENTION

1. Field of the Invention

The invention relates generally to methods for establishing a north-oriented or south-oriented line by circumpolar orientation for use in the positioning and aiming of artillery or for other uses wherein an instrument is aimed or aligned relative to a global pole by reference to circumpolar stars. In particular, the invention provides a reticle plate and methods useful therewith which can be directly applied to known optical instruments such as artillery aiming circles.

2. Description of the Prior Art

Reticles and devices employing reticles are well known in a great number of use environments wherein an instrument is aimed through alignment of the reticle with a target. Reticles may be as simple as the "crosshairs" of a firearm or as complex as scanning rotary reticles used to facilitate guidance of spacecraft and weaponry known popularly as "guided missiles". In the patent literature, Herter et al in U.S. Pat. 3,392,450; MacMillan in U.S. Pat. 3,383,987; O'Brien in U.S. Pat. 3,190,003; and Sullivan in U.S. Pat. 2,806,287 disclose reticles which assist in range finding and aiming of various devices. Herter et al disclose target spanning devices which take the form of circles used on a reticle disc. As a second particular example, Sullivan provides a plurality of concentric ring elements of differing diameters which are used to assist the user of a device in locating the exact center of a target.

A reticle is seen to be no more in its most basic embodiment than a set of two or more fine wires or lines placed at the principle focus of a telescope lens, the reticle being in the principle focus of the eyepiece of the lens so that direction of the telescope onto an object causes an image of the object and the reticle to be in clear view within the eyepiece. Reticles in a use environment particularly directed to that of the present invention are utilized in optical instruments such as a theodolite which constitutes a sighting telescope mounted for free rotation about horizontal and vertical axes. Graduated scales on such an instrument allow measurement of angles of rotation, such measurement allowing the use of a theodolite or similar device to be used for a variety of alignment functions as well as for length measurements, the establishment of incremental spacing of divided circles, such as for tooth spacing of a large gear, and for motion observation among other things. Relatively low-accuracy theodolites have also been employed for the positioning and aiming of artillery, such optical devices being referred to as aiming circles which comprise telescopes fitted with vertical and horizontal angle measurement circles. Orientation of an instrument using such optical apparatus involves the practice of methods such as the Polaris-Kochab method, the star gazer method and the Polaris II method, as examples. The Polaris-Kochab method requires multiple sightings with recordation of readings followed by reference to conversion tables and to a map sheet. A user of the Polaris-Kochab method must be extensively trained in order to master the complexities of the method. The star gazer and Polaris II methods require that the sighting instrument be fitted with a rotating reticle, thereby necessitating a redesign of presently available optical aiming instruments. Disposition of a rotary bearing in the optical path of such an instrument with any looseness or misalignment of the bearing unavoidably degrades instrument pointing accuracy.

The present invention finds advantage over the prior art by virtue of the simplicity of the disclosed reticle plate and of the methods of the invention, practice of the invention requiring no calculation on the part of a user, no modification to the aiming circle instrument, and the reduced requirement for training of a user of the instrument. Further, the present invention can be practiced without the requirement for ancillary materials such as "look-up" tables or maps which require plotting of converted values thereon. The invention thus allows ready establishment of a north-oriented or a south-oriented line under at least partially clear night conditions by orientation relative to circumpolar stars.

SUMMARY OF THE INVENTION

The invention provides an improved reticle plate for a theodolite such as can be used to establish a north-oriented or south-oriented line by circumpolar orientation. The reticle plate of the invention is exemplified by modification of the reticle of an M-2 aiming circle as is presently used by military units for orientation of artillery. The invention envisions the addition of three etched circles to the reticle of a theodolite such as the M-2 aiming circle. Location of the etched circles on the reticle plate is determined by angles existing between the celestial north pole (or south pole in the southern hemisphere) and the low-magnitude circumpolar stars selected as sighting points. The radii of the reticle circles are directly proportional to the objective lens focal length of the particular theodolite used in the practice of the invention. Selection of the particular circumpolar stars which are to be aligned with the reticle circles is dependent upon the optical instrument used and particularly upon the field of view of the instrument. In the northern hemisphere, for example, an observer using a theodolite having a 10° field of view would normally select the three brightest stars within that field of view, these stars being alpha Ursae minoris, delta Ursae minoris and 43 Cephei.

Alignment of the three selected stars with the three circles of the present reticle plate provides an unambiguous location for the pole, true north being at the cross hair center of the reticle on alignment of the three stars with the circles as aforesaid. Under partially clear conditions, the visibility of but two of the stars for a period of approximately one minute enables a sighting on the stars by use of innermost and outermost circles of the reticle plate to locate true north at the cross hair center of the plate. Reticle plates configured according to the invention and used according to the methods of the invention can be generated for establishment of a north-oriented line in the northern hemisphere and of a south-oriented line in the southern hemisphere.

Accordingly, it is a primary object of the invention to provide a reticle plate and methods for use thereof for establishment of a north-oriented or south-oriented line for use in surveying, construction and artillery positioning by circumpolar orientation utilizing an optical instrument such as a theodolite.

It is another object of the invention to provide a reticle plate for an optical sighting instrument such as an artillery aiming circle wherein the reticle of the instrument is additionally provided with three etched circles positioned on the reticle plate according to angles which exist between the celestial pole and low-magnitude circumpolar stars chosen as sighting points and with the circles having radii which are directly proportional to the objective lens focal length.

A further object of the invention is to provide circumpolar orientation methods for artillery positioning and the like which utilizes presently available aiming circles which are simply and inexpensively modified by the provision of etched circles positioned at predetermined locations on the reticle.

Further objects and advantages of the invention will become more readily apparent in light of the following detailed description of the preferred embodiments of the invention.

BRIEF DESCRIPTION OF THE DRAWING

FIG. 2 illustrates the alignment of three stars on the reticle circles.

FIG. 3 illustrates an incorrect alignment method for two stars.

FIG. 4 illustrates a correct alignment method for two stars.

DESCRIPTION OF THE PREFERRED EMBODIMENTS

Figure 1:
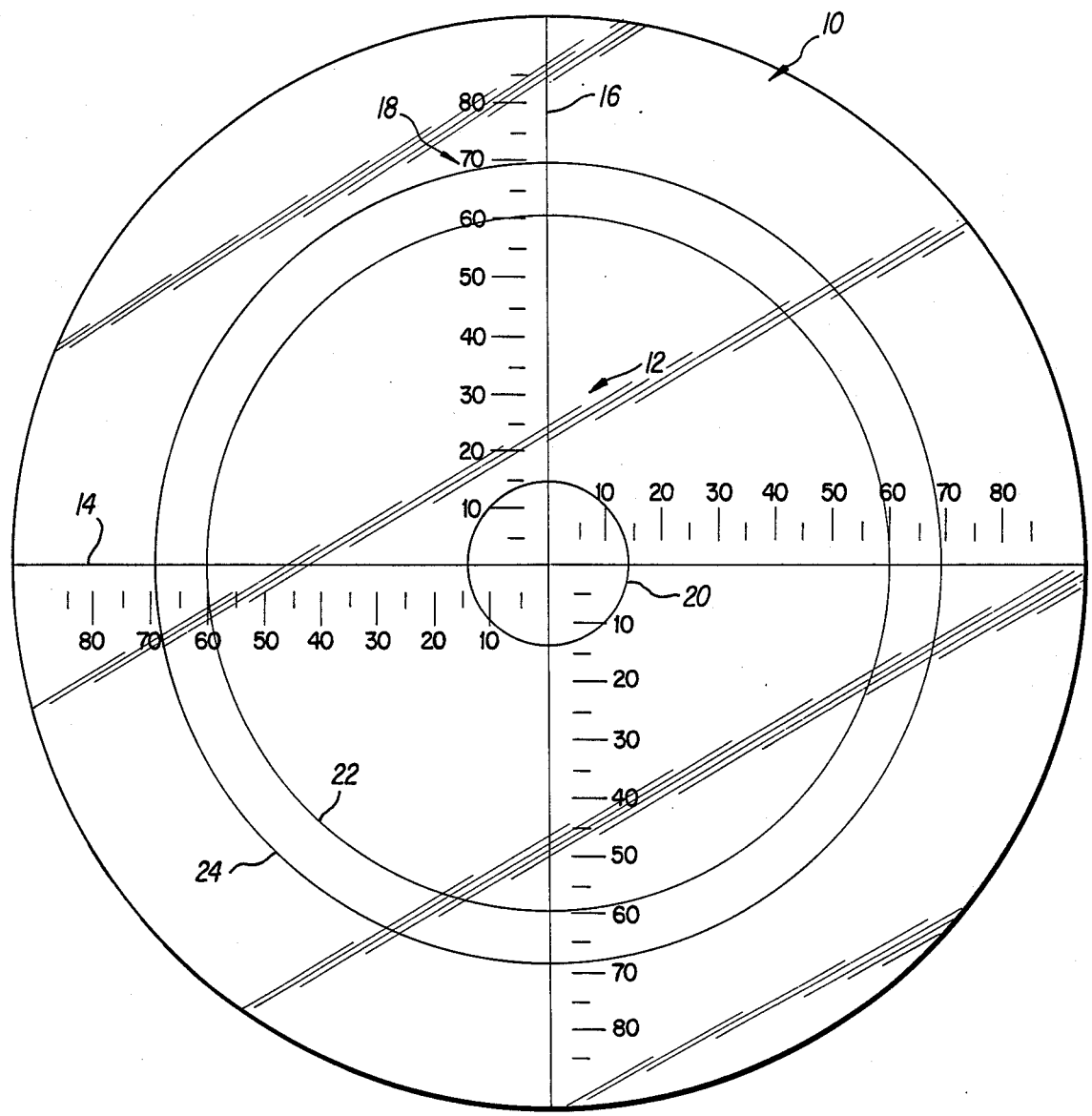
FIG. 1 is a schematic view of a reticle plate configured according to the invention, the reticle having three concentric circles circumscribed thereover for use in location of the north pole within the northern hemisphere.

A reticle plate configured according to the invention is best described in relation to the modification of a reticle such as is used in a presently available optical aiming instrument such as the M-2 aiming circle presently in use by the U.S. Army for orientation of artillery. The M-2 aiming circle is a telescope fitted with vertical and horizontal angle measurement circles and essentially comprises a relatively low-accuracy theodolite. This common theodolite is simply and inexpensively modified according to the invention to allow establishment of a north-oriented line in the northern hemisphere or a south-oriented line in the southern hemisphere under at least partially clear night conditions using circumpolar stars for orientation. The present reticle plate replaces the standard M-2 reticle or the reticle of a similar instrument without modification of the instrument or impairment of prior functions of the instrument.

As seen in the drawing, a schematic representation of a reticle plate configured according to the invention is seen at 10 to comprise a reticle 12 comprised of horizontal and vertical intersecting hairline elements 14 and 16. Scales 18 extending along each of the hairline elements 14 and 16 on either side of the intersection thereof relate to reticle readings. The reticle 12 thus configured is provided according to the invention with three essentially concentric circles 20, 22 and 24, the circle 20 being the innermost circle and having a diameter which is substantially smaller than the diameters of the midcircle 22 and the outermost circle 24. The circles 20, 22, 24 are preferably etched onto the reticle plate 10 in a known manner, the line quality of the circles being made of a fineness which is of the same order as the fine line quality of the hairline elements 14 and 16 of the reticle 12. The location of the circles 20, 22, 24 on the reticle plate 10 is dependent both on the particular low-magnitude circumpolar stars which are preselected as sighting points and on the particular optical sighting instrument within which the reticle plate of the invention is used. The circle locations can thus be determined empirically or by determination of the angles existing between the celestial north pole (in the northern hemisphere) and the particular circumpolar stars selected as sighting points, this consideration resulting in a determination of the relative spacing between the circles. The actual sizes of the circles 20, 22, 24, that is, the radii thereof, are directly proportional to the objective lens focal length of the particular optical instrument within which the reticle plate 10 is to be used. Accordingly, a separate reticle plate is configured for each type of instrument with which the plate 10 and the present methods are to be used.

Selection of the circumpolar stars which determine the relative locations of the circles 20, 22, 24 on the reticle plate 10 depends upon the hemisphere within which the instrument is to be used and the field of view of the instrument. For example, a northern hemisphere observer using a theodolite having a 10° field of view would typically select the three brightest stars within that field of view, the stars being alpha Ursae minoris, delta Ursae minoris and 43 Cephei. These circumpolar stars are adequate for orientation according to the invention since these stars have polar distances which are approximately equal to or less than the latitude of an observer using the theodolite under the conditions used for this example. In general, the north pole is centered at the intersection of the hairline elements 14 and 16 of the reticle 12 by respective alignment of the three stars with the circles 20, 22, 24 to locate unambiguously the global pole necessary for establishment of a line oriented relative to the pole. FIG. 2 illustrates three stars being aligned with circles 20, 22 and 24.

In the example given above, the innermost circle 20 is aligned with alpha Ursae minoris which is also known as Polaris, this star typically constituting one of the stars utilized in the practice of the invention and being typically aligned with the innermost circle 20. When only partially clear night sky conditions exist, it is possible to use the reticle plate 10 through the use of only two stars as long as the two stars are visible for a sufficient period of time to sight on the stars, this time being approximately one minute for a suitably trained user of the optical instrument employed. As an example, two stars such as alpha Ursae minoris and delta Ursae minoris can be thus used, these stars being set on respective reticle circles 20 and 24 such that the intersection of the hairline elements 14 and 16 lies in a counter-clockwise direction from an imaginary line drawn between the two stars and pivoted about alpha Ursae minoris. FIG. 4 illustrates the correct alignment of the two stars while FIG. 3 illustrates an incorrect alignment of the two stars. In the practice of this method, alpha Ursae minoris must be set on the innermost circle 20 and delta Ursae minoris on the outermost circle 24. It is to be understood that both the three-star and two-star methods can be used with other groups of stars given the ability of an observer to recognize the stars which are being viewed and the relationship thereof to the pole. The invention can be used with equal facility both in the northern hemisphere to locate the north pole and in the southern hemisphere to locate the south pole. Use of the invention in either hemisphere allows establishment of a common direction without communications and facilitates a rapid check on survey direction, these functions being readily accomplished due to the negligibility of instrument-to-instrument error as compared to inherent method error.

Considering now the particular use of the circumpolar methods according to the invention for artillery positioning using the M-2 aiming circle, the present method is seen to be practiced in the following stepwise manner: (A) orient the aiming circle by setting off the DeclinationConstant and floating the magnetic needle; (B) determine latitude in by multiplying known latitude by 18 followed by elevation of the aiming circle to the reading thus obtained to cause Polaris to appear as the brightest star and near the center of the field of view; (C) elevate and traverse the aiming circle to place alpha Ursae minoris, delta Ursae minoris and 3 Cephei on respective reticle circles 20, 22, 24, true north then being located at the intersection of the hairline elements 4 and 16 of the reticle 12; (D) depress the aiming circle so that the field of view is within the battery location and traverse the circle as appropriate to convert true north direction to grid north direction; and, (E) position a lighted aiming stake (not shown) at a location in line with the intersection of the elements 14 and 16, that is, the crosshair center, the aiming stake acting as the orienting line for immediate laying of the battery by the well-known grid azimuth method.

Errors inherent in the method are simplified by the assumption of the lack of error in instrument pointing or in the geometry of the reticle circles 20, 22, 24. Less avoidable sources of error include differential refraction and precession of the earth's axis. In a worst case, differential refraction is greatest where the alignment of alpha Ursae minoris and delta Ursae minoris is vertical. Thus, given that the angle between these two stars is approximately 4°, error can be determined by using the refraction equation $$R = 58.294 \tan X - 0.0668 \tan^3 Z$$

wherein
R = refraction angle in arc seconds; and
Z = zenith distance (that is, angle from verticle) in degrees of arc.

The separation of $\delta$ (declination) and $\alpha$ (right ascension) due to refraction is a function of zenith distance and is readily determined according to known calculation. The north pointing error is slightly less than the separation error of the two stars and is close to being identical thereto. In a worst-case analysis, star separation error is therefore taken to be the north pointing error. Since precession of the earth's axis can be considered to be a linear secular motion over a time period of from 100 to 200 years, true north drifts away from the direction determined to be north over a period of time. Reticle plates 10 configured according to the invention should thus be updated and replaced every ten years, the reticle for a given decade being configured to be correct in the middle of the decade to provide a maximum error at the extremes of the decade due to precession of approximately 0.4 mils (1 mil = 3.38 arc minutes).

The error of pointing with an aiming circle such as the M-2 aiming circle will therefore be within a setting circle least count which is 0.5 mil. Use of the present methods above 6° latitude gives a worst-case error of less than 2 mils with a typical error of less than 1 mil, thereby comparing favorably to other methods of circumpolar orientation and without the complexities involved with these other methods. An M-2 aiming circle modified according to the invention will typically elevate to approximately 65°, this elevation not being substantially restrictive due to the fact that only approximately 10% of the global land area lies in regions above 65° north latitude and below 65° south latitude.

The invention thus provides a reticle plate and methods for use thereof in association with optical aiming instruments for establishing a north-oriented or south-oriented line in a simple and rapid manner. While the invention has been described with respect to particular embodiments, it is to be understood that the scope of the invention is limited solely by the recitations of the appended claims.

We claim:

1. In an optical aiming apparatus, a transparent reticle disc having visible indicia carried by the disc, the indicia comprising:
   hairline elements formed on the disc and intersecting centrally thereof to form a reticle; and,
   a plurality of circles formed on the disc and having the intersection of the hairline elements as a common center, the circles are each located on the reticle disc to align with preselected circumpolar stars to cause a global pole to be centered on the intersection of the hairline elements on alignment of the reticle disc to place each star on one each of the circles.

2. The apparatus of claim 1 wherein the circles are each located on the reticle disc to align with preselected circumpolar stars to cause a global pole to be centered on the intersection of the hairline elements on alignment of the reticle disc to place each star on one each of the circles.

3. The apparatus of claim 2 wherein the reticle disc is provided with at least two circles.

4. The apparatus of claim 2 wherein the reticle disc is provided with three circles.

5. The apparatus of claim 2 wherein the apparatus comprises a theodolite used for establishing a line oriented with respect to the global pole and the circles are respectively positioned on the reticle disc by a determination of the angle between the pole and the respective star with which the given circle is alignable, the radii of the circles being directly proportional to the objective lens focal length of the theodolite.

6. The apparatus of claim 1 wherein one of the hairline elements is disposed in a vertical sense on the disc and the other hairline element is disposed in a horizontal sense.

7. A method for location of a direction having a predetermined relationship to selected visual objects using an optical aiming reticle including intersecting hairline elements in a plurality of circles having the intersection of the hairline elements as a common center, each circle being disposed on the reticle in a location alignable with one of the visible objects, comprising:
   orientation of the reticle generally in the direction to be established;
   aligning each one of the circles with one each of the visible objects to cause the objects to be simultaneously disposed on the circumference of the respective circles; and,
   marking the direction sought as being coincident with the intersection of the hairline elements.

8. The method of claim 7 wherein the direction to be located is the direction to a global pole and the selected visual objects are circumpolar stars, the reticle being carried by a theodolite, true global pole being coincident with the intersection of the hairline elements on alignment of the stars with the circles.

9. The method of claim 8 and further comprising the step of establishing a pole-oriented line along the direction to the pole.

10. The method of claim 8 wherein the direction to the north pole is to be determined and at least two circles are provided on the reticle, one each of two stars being respectively aligned with one each of the circles, alpha Ursae minoris being one of the stars and being aligned with the innermost circle, the method further comprising positioning the stars on the respective circles to cause the intersection of the hairline elements to lie in a counterclockwise direction from a line drawn between the stars and pivoted about alpha Ursae minoris, the direction to the north pole being coincident with the intersection of the hairline elements.

* * * * *